US008386207B2

(12) United States Patent  
Mathur et al.

(10) Patent No.: US 8,386,207 B2  
(45) Date of Patent: Feb. 26, 2013

(54) OPEN-SERVICE BASED TEST EXECUTION FRAMEWORKS

(75) Inventors: Aashish K. Mathur, Karnataka (IN); Praveen K. Sinha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 12/627,711

(22) Filed: Nov. 30, 2009

(65) Prior Publication Data

US 2011/0131001 A1      Jun. 2, 2011

(51) Int. Cl.
G06F 19/00      (2006.01)
(52) U.S. Cl. .................................... 702/122
(58) Field of Classification Search .................. 702/122
See application file for complete search history.

(56) References Cited

U.S. PATENT DOCUMENTS

| | | | |
|---|---|---|---|
| 6,859,922 B1 | 2/2005 | Baker et al. | |
| 7,020,797 B2 | 3/2006 | Patil | |
| 7,231,437 B2 | 6/2007 | Boudnik et al. | |
| 7,254,607 B2* | 8/2007 | Hubbard et al. | 709/203 |
| 7,415,635 B1 | 8/2008 | Annangi | |
| 7,506,044 B2 | 3/2009 | Doshi et al. | |
| 7,529,990 B2* | 5/2009 | Haggerty | 714/724 |
| 7,823,147 B2* | 10/2010 | Moshir et al. | 717/173 |
| 2003/0126260 A1 | 7/2003 | Husain et al. | |
| 2006/0080389 A1 | 4/2006 | Powers et al. | |
| 2007/0174711 A1 | 7/2007 | Uehara et al. | |
| 2007/0180447 A1 | 8/2007 | Mazzaferri et al. | |
| 2007/0180493 A1 | 8/2007 | Croft et al. | |
| 2008/0120602 A1 | 5/2008 | Comstock et al. | |
| 2008/0163015 A1* | 7/2008 | Kagan et al. | 714/724 |
| 2008/0256389 A1 | 10/2008 | Neethiraj et al. | |
| 2009/0007074 A1 | 1/2009 | Campion et al. | |

OTHER PUBLICATIONS

Xiaoying Bai et al, "A Multi-Agent Based Framework for Collaborative Testing on Web Services", 4th IEEE Workshop on Software Technologies for Future Embedded and Ubiquitous Systems and the Second International Workshop on Collaborative Computing, Integration, and Assurance-SEUS 2006/WCCIA 2006, 6 pp., 2006.
Yang et al, "Constructing an Object-Oriented Architecture for Web Application Testing", Journal of Information Science and Engineering 18, 59-84 (2002), http://www.iis.sinica.edu.tw/page/jise/2002/200201_06.pdf.
Eickelmann, Nancy S., et al, "An Evaluation of Software Test Environment Architectures", Proceedings of ICSE-18, 1996 IEEE, http://seclab.cs.ucdavis.edu/projects/testing/papers/eick96.pdf.
Schimkat, Ralf-Dieter et al, "Tempto-An Object-Oriented Test Framework and Test Management Infrastructure Based on Fine-Grained XML-Documents", http://www.netobjectdays.org/www_old_netobjectdays_org/pdf/00/papers/ooss/schimkat.pdf.

* cited by examiner

*Primary Examiner* — Aditya Bhat
(74) *Attorney, Agent, or Firm* — Ference & Associates LLC (57) ABSTRACT

An open-service based test execution framework that is based on disconnected architecture, with agent-initiated "REST" connectivity. Further contemplated herein are systems and methods for "unified resource store access" test management, distribution and execution.

25 Claims, 10 Drawing Sheets

OPEN-SERVICE BASED TEST EXECUTION FRAMEWORKS

BACKGROUND

Generally, conventional test execution frameworks in a distributed environment include a central controller and repository that manages the tests, agents that can execute this test, and a live connection from the controller to each of the agents. Usually, the controller controls which agent or agents will run the tests, and then deploys the tests to the selected agent. As such, the agents normally require code from the controller to be able to execute tests and report the results back.

Several drawbacks have been noted in conventional arrangements. First, an agent generally needs to open up an appropriate port to permit controller access to the agent. In so doing, the agent opens an unsecured gateway to a test lab, inviting possible breaches by unauthorized parties. Further, a persistent connection is usually needed through such an open port, thus increasing the likelihood of an unauthorized breach as a function of the time involved.

Typically, an agent will also require logging libraries to be provided in order to implement a custom agent, whereupon mismatches (e.g., in the area of code or version) of libraries may well become an issue in implementing the custom agent.

Additionally, in terms of an especially significant drawback, since the controller controls which agent to use, it may at times be the case that a selected agent will be unavailable, thus causing a desired execution to terminate abnormally.

Conventional solutions have involved the use of a Rational® Test Manager® agent and an Eclipse® Edition TPTP (Test and Performance Tools Platform) agent. (® is available through International Business Machines Corporation of Armonk, N.Y. while Eclipse® Edition TPTP is provided by the Eclipse Foundation, an open source community [www.eclipse.org]) Custom programs may therefore be provided which assume the role of a server and prompt controllers to connect over a non-standard port. However, in such a setting, the medium which facilitates communication between the controller and the agents will typically use non-standard and/or technology-specific data dictionaries or schema. Additional problems can thus arise from this, as briefly outlined below.

Firstly, firewalls as normally employed in a restricted or secure test lab environment will place limits on the use of non-standard ports. Communication as just described may be entirely precluded. Secondly, to the extent that many test labs often sit inside a highly restricted (e.g., militarized) network zone, access to external networks or connections may well be highly limited as it is. Thus, it may be difficult if not impossible to gain access to common resources such as file servers, update servers and the like. Further, an agent writer will typically have to learn the specifics of both the execution tool and the controller, so that data can be effectively retrieved, and that execution and other tasks can be initiated from the tool and logged back to the controller. For its part, the controller typically accepts data only in its own specific, non-standardized format.

BRIEF SUMMARY

Broadly contemplated herein, in accordance with at least one embodiment of the present invention, are methods and arrangements for changing and augmenting the conventional processes discussed heretofore to result in a remote test execution process that is centrally manageable while being more open, scalable and secure.

More particularly, there is broadly contemplated herein, in accordance with at least one embodiment of the present invention, an open-service based test execution framework that is based on disconnected architecture, with agent-initiated "REpresentational State Transfer" (REST) connectivity. Further contemplated herein are systems and methods for "unified resource store access" test management, distribution and execution.

For a better understanding of embodiments of the invention, together with other and further features and advantages thereof, reference is made to the following description, taken in conjunction with the accompanying drawings, and the scope of the claimed embodiments of the invention will be pointed out in the appended claims.

In summary, one aspect provides a system comprising: a test execution system having one or more processors and one or more modules executable by the one or more processors, the one or more modules comprising: computer program code configured to register an agent with a server mechanism; computer program code configured to poll a server mechanism with a work request; computer program code configured to maintain communication between an agent and a test tool and prompt test execution via the test tool; and computer program code configured to maintain communication between an agent and a server mechanism via a directed connection.

Another aspect provides a method comprising: registering an agent with a server mechanism; polling a server mechanism with a work request; maintaining communication between an agent and a test tool and prompting execution via the test tool; and maintaining communication between an agent and a server mechanism via a directed connection.

An additional aspect provides a computer program product comprising: a computer readable storage medium having computer readable program code embodied therewith, the computer readable program code comprising: computer program code configured to register an agent with a server mechanism; computer program code configured to poll a server mechanism with a work request; computer program code configured to maintain communication between an agent and a test tool and prompt test execution via the test tool; and computer program code configured to maintain communication between an agent and a server mechanism via a directed connection.

DETAILED DESCRIPTION

It will be readily understood that the components of the embodiments of the invention, as generally described and illustrated in the figures herein, may be arranged and designed in a wide variety of different configurations in addition to the described embodiments. Thus, the following more detailed description of the embodiments of the invention, as represented in the figures, is not intended to limit the scope of the embodiments of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings/figures. The following description is intended only by way of example and simply illustrates certain selected embodiments of the invention as claimed herein.

Regarding the figures, the flowchart and block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description now turns to the figures and select embodiments of the invention will be described. The following description of various embodiments of the invention is presented to highlight certain aspects of the invention, and the scope of the claimed embodiments of the invention will be pointed out in the appended claims.

Figure 1:
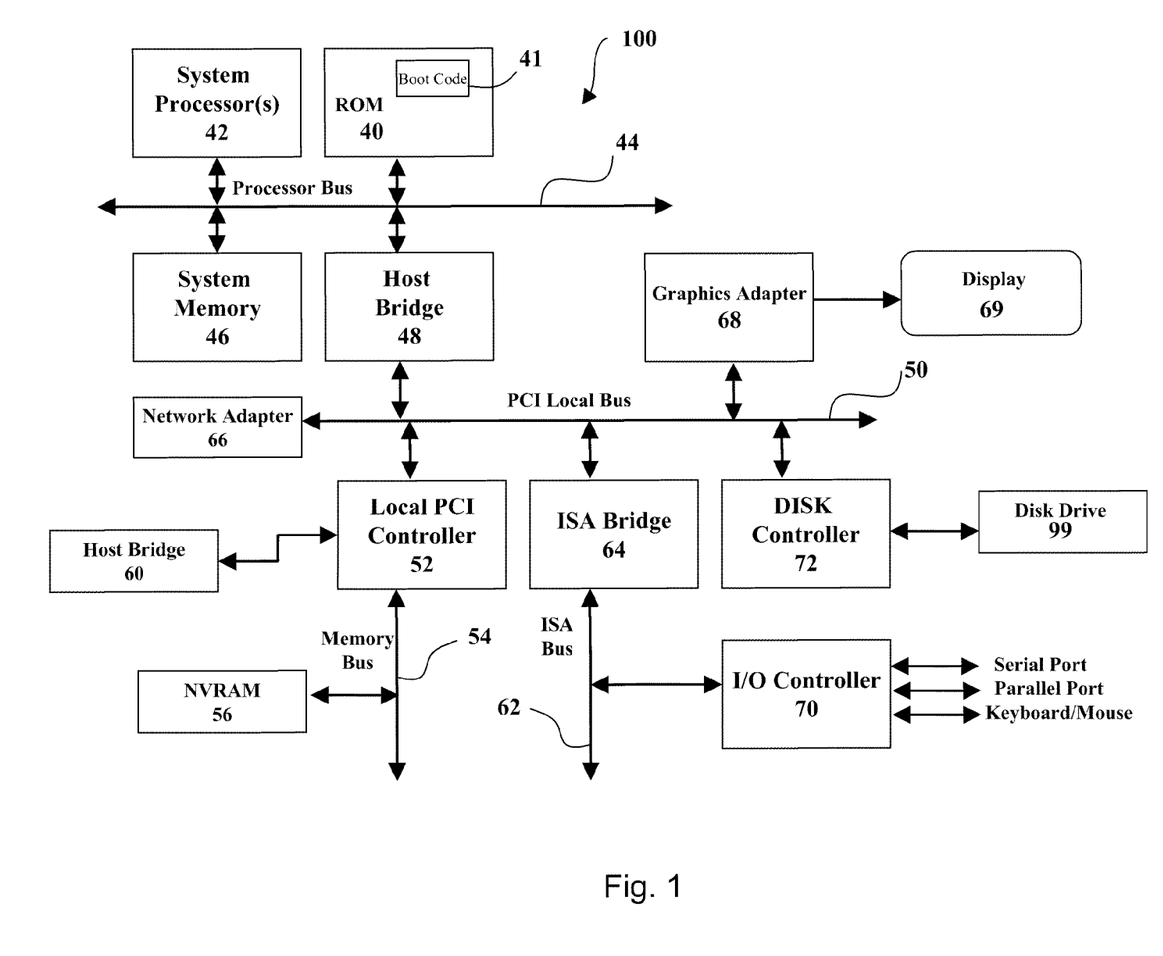
FIG. 1 illustrates a computer system.

Referring now to FIG. 1, there is depicted a block diagram of an illustrative embodiment of a computer system 100. The illustrative embodiment depicted in FIG. 1 may represent a device such as a game console, a set top box, a mobile device, a laptop, or a desktop or workstation computer. As is apparent from the description, however, embodiments of the invention may be implemented in any appropriately configured device or computing system, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to a LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, etc. A disk controller 72 connects a disk drive 99 with PCI local bus 50. The USB Bus and USB Controller (not shown) are part of the Local PCI controller (52).

The disclosure now turns to a discussion of various embodiments in accordance with the present invention and as illustrated in FIGS. 2-10. It should be understood and appreciated that a "system under test" or "client" as discussed herebelow and illustrated or referenced among FIGS. 2-10, may be embodied by essentially any suitable computer system, such as that (by way of an illustrative and non-restrictive example) indicated at 100 in FIG. 1. Among FIGS. 2-10, reference numerals indicating analogous or similar components are advanced by multiples of 100.

By way of some general aspects according to at least one embodiment of the present invention, there is preferably included an agent-controller polling architecture on a standard HTTP agent-controller connection. This can ease the logistics of opening up a port on the agent.

Further, there may preferably be employed communication that uses a standard HTTP connection with open REST-ful services. This can greatly reduce or eliminate the need to expose and deploy libraries on the agent and controller. (A REST-ful web service is a generally simple web service implemented using HTTP and the principles of REST, or "Representational State Transfer".) In this manner, concerns regarding agent complexity, version mismatch and other matters can be alleviated.

In accordance with at least one embodiment of the present invention , with a standard open resource data format employed in communication, an agent will no longer need to learn the type of data that a specific controller might expect.

Preferably, with a controller acting as a server, there will be exposed everything that an agent will require to run a test via itself As such, test assets can be managed, access can be controlled and security can be checked at the controller itself Further, the test assets can be downloaded without opening up new connections from the agent.

Further, in accordance with at least one embodiment of the present invention, as the agent continues to poll the server, the server will continue to be able to assess the health of the agent. In contrast, in conventional agent mechanisms, if the communication port on the agent somehow gets closed, or the agent becomes unavailable, there is no way to ascertain what went wrong and the time the closing event happened. In such settings, the only way to ascertain the availability of an agent is to actually perform an action against that agent, which of course obviates being able to make an informed decision of selecting an agent in the first place.

Figure 2:
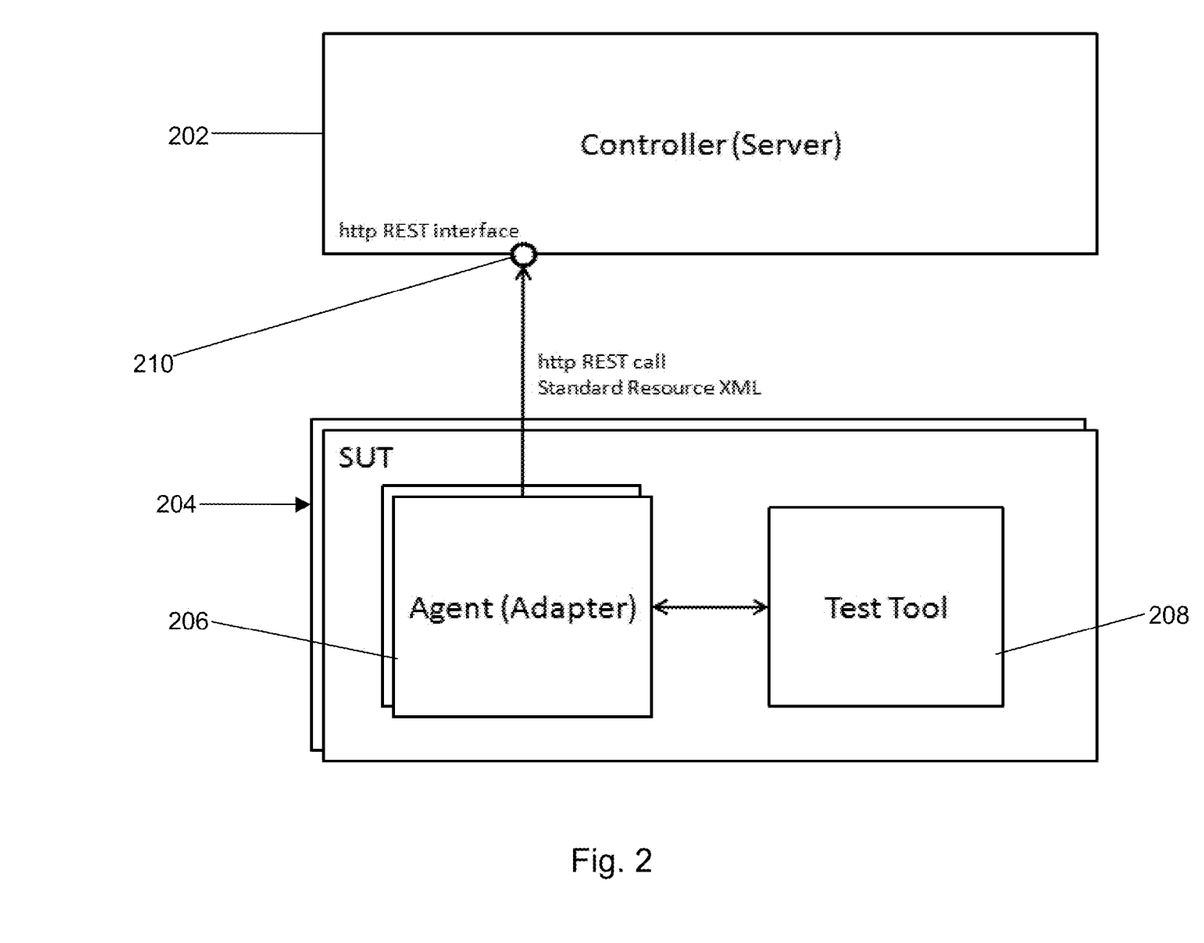
FIG. 2 schematically illustrates simple interaction between a controller, agent and test tool.

Turning now to FIG. 2, which schematically illustrates a simple scheme of interaction in accordance with an embodiment of the present invention, it should first be appreciated that some core constituents may be involved. Controller 202 is a central execution controller which acts essentially as a server. In essence it is a server, which takes in an execution request from a tester and delegates it to an agent for execution.

Also shown in FIG. 2 are an agent 206 and test tool 208. Agent 206 can preferably be embodied by software that serves as an agent or adapter between controller 202 and test tool 208, while test tool 208 itself preferably is configured to execute tests on the agent 206. Typically, agent 206 and test tool 208 may be installed on a remote machine away from the controller 202. In the context of functional testing, as in the case of FIG. 2, the machine may be the actual "system under test" (SUT) 204 while, in other cases such as performance testing, the SUT may be another remote machine.

Preferably, two sets of interactions will take place. On the one hand, there will preferably be a HTTP REST-ful interaction (or call) between the agent 206 and controller 202. This interaction between agent 206 and controller 202 preferably enters controller 202 through a HTTP REST interface 210. On the other hand, there will also preferably be interaction between agent 206 and tool 208 dependent upon the particular implementation of agent 206 and tool 208.

The HTTP REST-ful interaction, for its part, is preferably a directed connection from the agent 206 to the controller 202. As such, the agent 206 need not necessarily expose any port for the controller 202 to delegate work to the latter; the work, in fact, may preferably be created and kept in the controller 202, via a process of agent registration now to be described.

Figure 3:
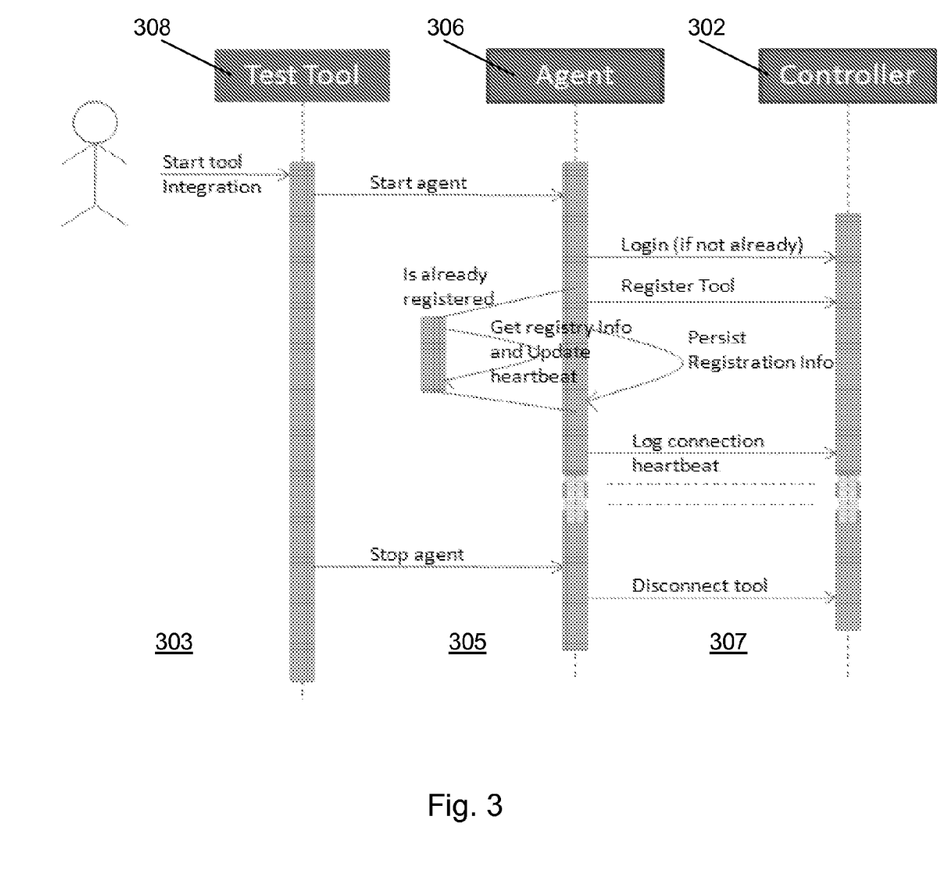
FIG. 3 schematically illustrates a process flow for agent registration, relative to the example of FIG. 2.

FIG. 3 schematically illustrates a process flow for agent registration, relative to the example of FIG. 2. Process actions relating solely to the test tool 308 are shown in (drawing) field 303, while process interactions between test tool 308 and agent 306 are shown in field 305 and those between agent 306 and controller 302 are shown in field 307. Essentially, upon starting tool integration (303) and starting the agent (305), and (if necessary) logging in (307), either the test tool will be registered (or the agent on behalf of the test tool will be registered) and the registration info. integrated/persisted at controller 302 (field 307) or, if test tool 308 is already registered, registry information will be obtained (305). Then, a log connection heartbeat between agent 306 and controller 302 is preferably established (307) until the agent is stopped (305) and the tool disconnected (307). At this point, controller 302 will be in a position at future junctures to readily determine which agent (potentially among several) can handle a work request.

Figure 4:
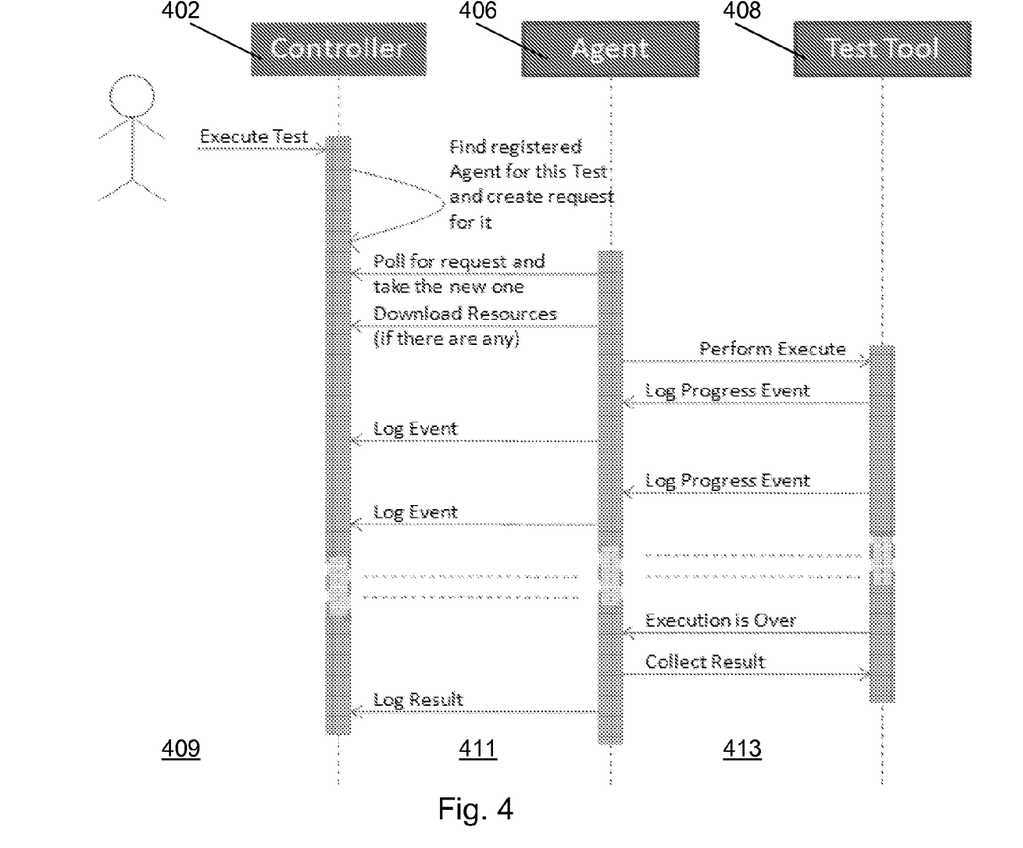
FIG. 4 schematically illustrates a process flow for remote test execution, relative to the example of FIG. 2.

As such, FIG. 4 schematically illustrates a process flow for remote test execution, relative to the example of FIG. 2. Process actions relating solely to the controller 402 are shown in (drawing) field 409, while process interactions controller 402 and agent 406 are shown in field 411 and those between agent 406 and test tool 408 are shown in field 413.

With an order to execute a test (409), controller 402 will then preferably aim to find a registered agent 406 for the test and request a test for same (411). The agent 406 then preferably polls the controller 402 for work at regular intervals and marks the work as "taken" (411). (Intervals as mentioned could be in the neighborhood of a few seconds, e.g., about three seconds. In this way the agent will not monopolize CPU resources, while still allowing for a response time that isn't perceived as too slow.) It then (411) downloads the work details and any resources (e.g., a test and its associated data) to controller 402 and then (413) hands over execution to the test tool 408. Test tool 408 can intermittently generate some events during execution, which are uploaded to the controller 402 via the agent 406 (see "log progress event" at 413 and "log event" at 411). At the end of execution, the agent 406 preferably collects all the logs from test tool 408 ("collect result" at 413) and uploads them to the controller 402 ("log result" at 411).

Returning briefly to FIG. 2. as a matter of relevance to all of FIGS. 2-4 and as now can be seen and appreciated, all the communication for an execution between the test tool 208 and controller 202 need take place with only one connection, which is the HTTP REST call from agent 206 to controller 202. Thus, the server (here in the form of controller 202) need not maintain a static connection with the agent 206, while agent 206 itself need not open any port for the purpose of establishing or maintaining such a connection.

Figure 5:
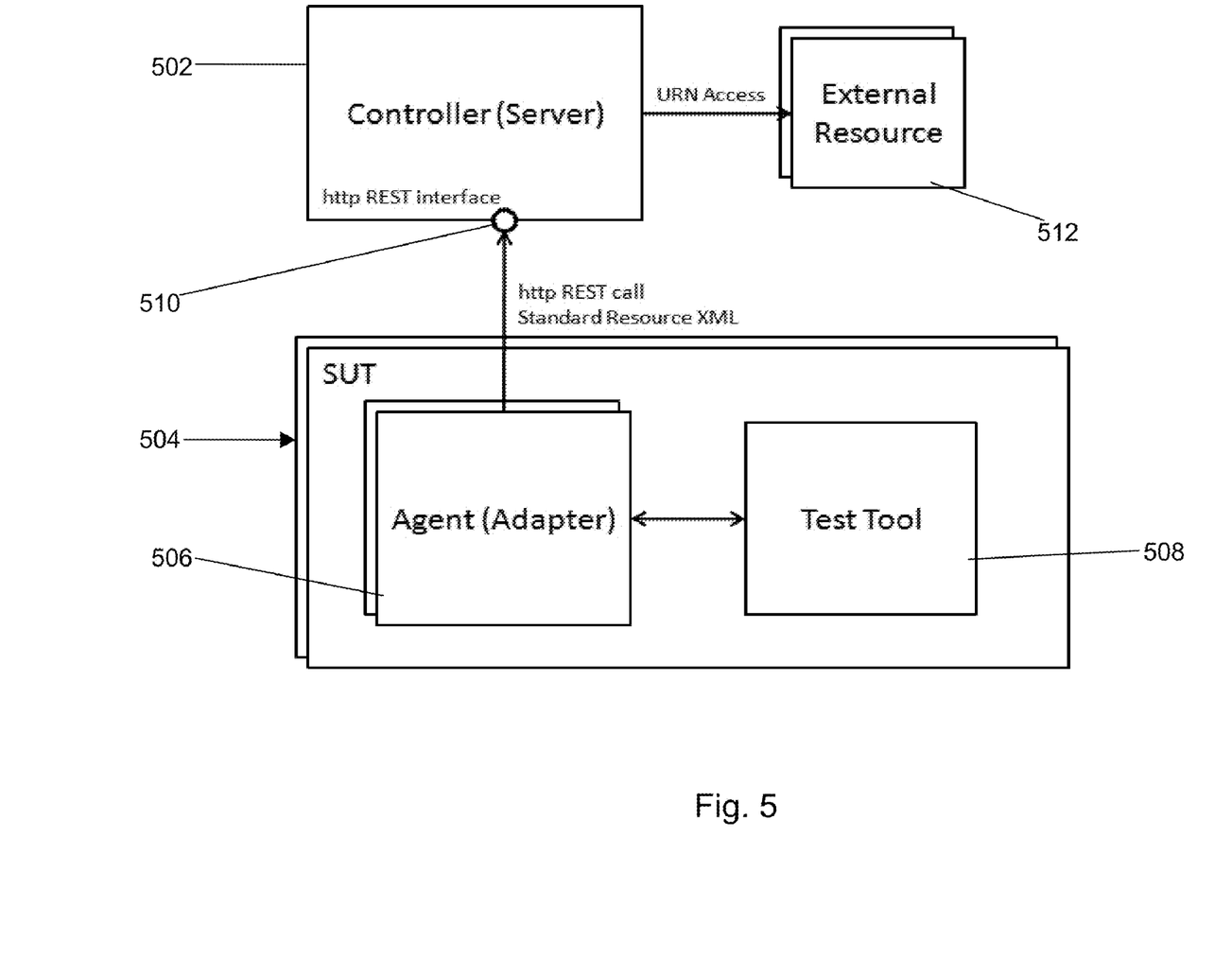
FIG. 5 is essentially the same view as FIG. 2, but additionally depicting external resource access.

FIG. 5 is essentially the same view as FIG. 2, but additionally depicting external resource access. Particularly, in this variant case, controller 502 has URN (Uniform Resource Name) access to an external resource 512; such access can also be availed to multiple external resources. (By way of an illustrative and non-restrictive example of an external resource, a typical script that is being executed may actually reside on an external system and need to be drawn upon and served to the test tool. In another example, script being executed may need other inputs such a data set file or dependent code that is determined at runtime, and that resides in an external shared repository.) In this manner, all external resources can be exposed via controller 502. Preferably, controller 502 exposes one or more external resources 512 as REST URL's to agent 506. All security and access controls can be managed and controlled by the controller itself.

FIG. 6-9 illustrate how relatively simple designs such as those broadly contemplated in accordance with FIGS. 2-5 can be enhanced to make a framework more scalable, whereby an agent may be abstracted from a test tool. Such an arrangement can be beneficial in a context where a large number of tools may desire connection to a controller, whereupon an agent may essentially serve as a proxy to the main controller while also providing a local persistency for an offline execution.

Figure 6:
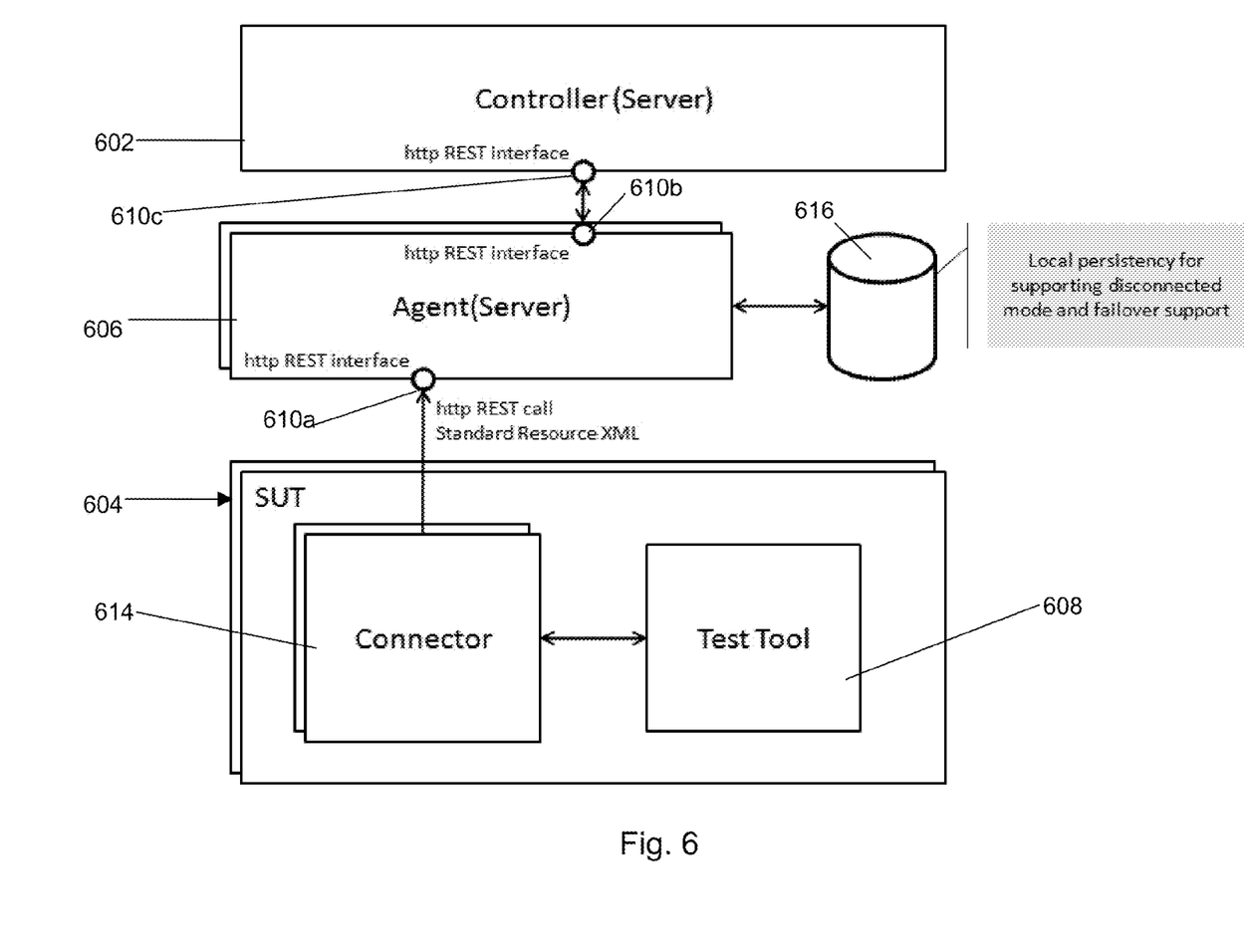
FIG. 6 is essentially the same view as FIG. 2, but additionally illustrating an application of scalability.

As such, FIG. 6 is essentially the same view as FIG. 2, but additionally illustrating an application of scalability. As shown, SUT 604 includes test tool 608 and a connector 614, the latter being in communication with agent 606 via a similar REST connection as between agent 206 and controller 202 of FIG. 2. Here, agent 606 is actually separate from SUT 604 and, in combination with controller 602, acts as a server much as the controller 202 alone acted as a server in the example of FIG. 2. As such, agent 606 preferably includes a HTTP REST interface (port) 610a similar to interface 210 of FIG. 2 and also may preferably be in communication with a database 616. This database 616 can preferably provide local persistency for supporting a disconnected mode of agent 606 with respect to controller 602, as well as failover support.

As shown, agent 606 and controller 602 may preferably be in communication with one another via respective HTTP REST interfaces 610b and 610c disposed at agent 606 and controller 602, respectively.

Figure 7:
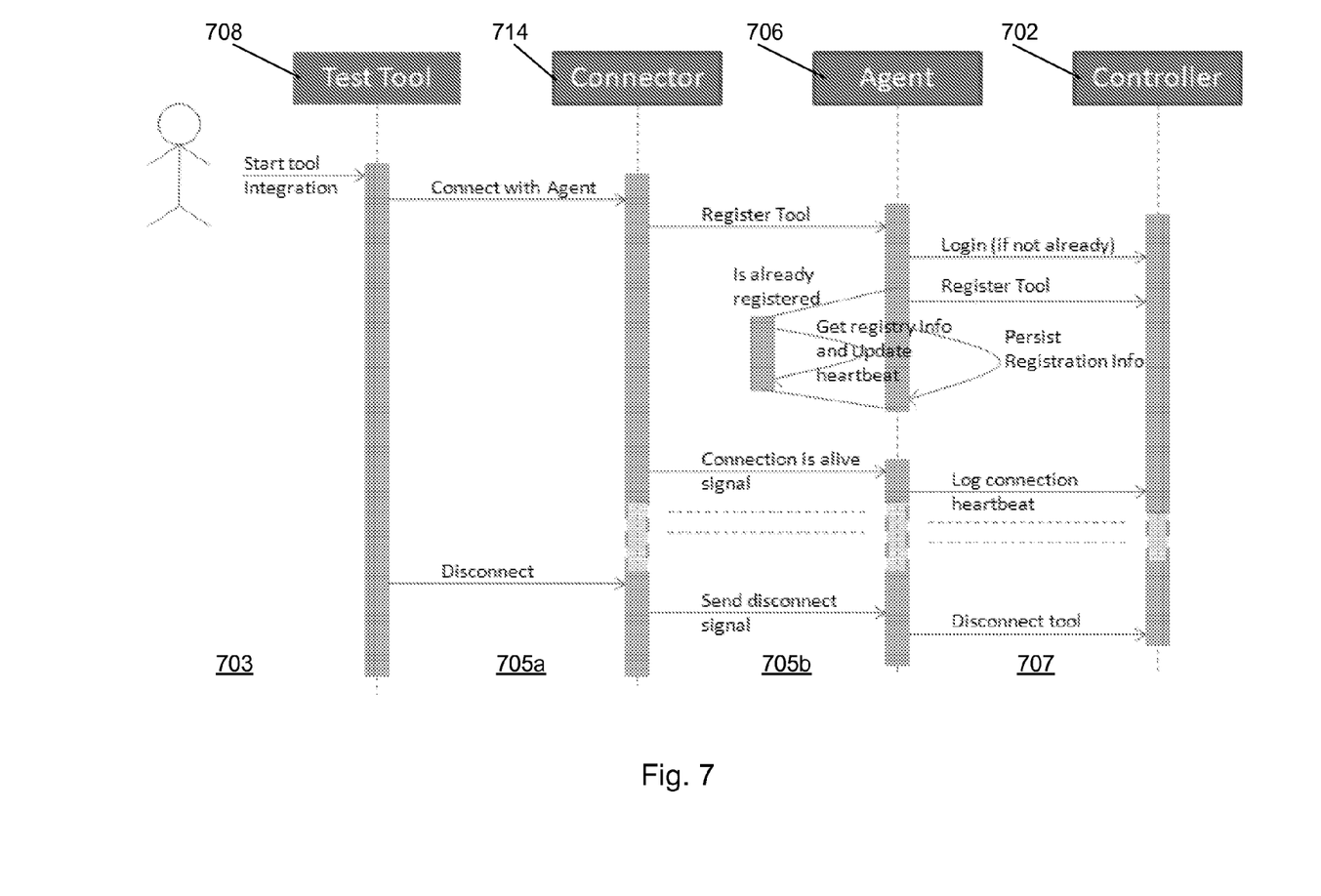
FIG. 7 is essentially the same view as FIG. 6, but additionally depicting external resource access.

FIG. 7 schematically illustrates a process flow for test tool and agent registration, relative to the example of FIG. 6. Essentially, the process of FIG. 7 is similar and analogous to that of FIG. 3, with the main difference being the interposition of connector 714 between test tool 708 and agent 706. Process actions relating solely to the test tool 708 are shown in (drawing) field 703, while process interactions between test tool 308 and connector 714 are shown in field 705a. For their part, process interactions between connector 714 and agent 706 are shown in field 705b while those between agent 706 and controller 702 are shown in field 707.

Essentially, upon starting tool integration (703) and connecting with the agent (705a), sending a tool registration command from the connector 714 to the agent 706 (705b) and (if necessary) logging in (707), either the test tool will be registered (or the agent on behalf of the test tool will be registered) and the registration info. integrated/persisted at controller 702 (field 707) or, if test tool 708 is already registered, registry information will be obtained (705b). Then, a log connection heartbeat between agent 706 and controller 702 is preferably established (707), as well as a "connection is alive" signal between connector 714 and agent 706 (705b) until a disconnect signal is sent from test tool 708 to agent 706 (705a/705b) and the tool disconnected (707).

Figure 8:
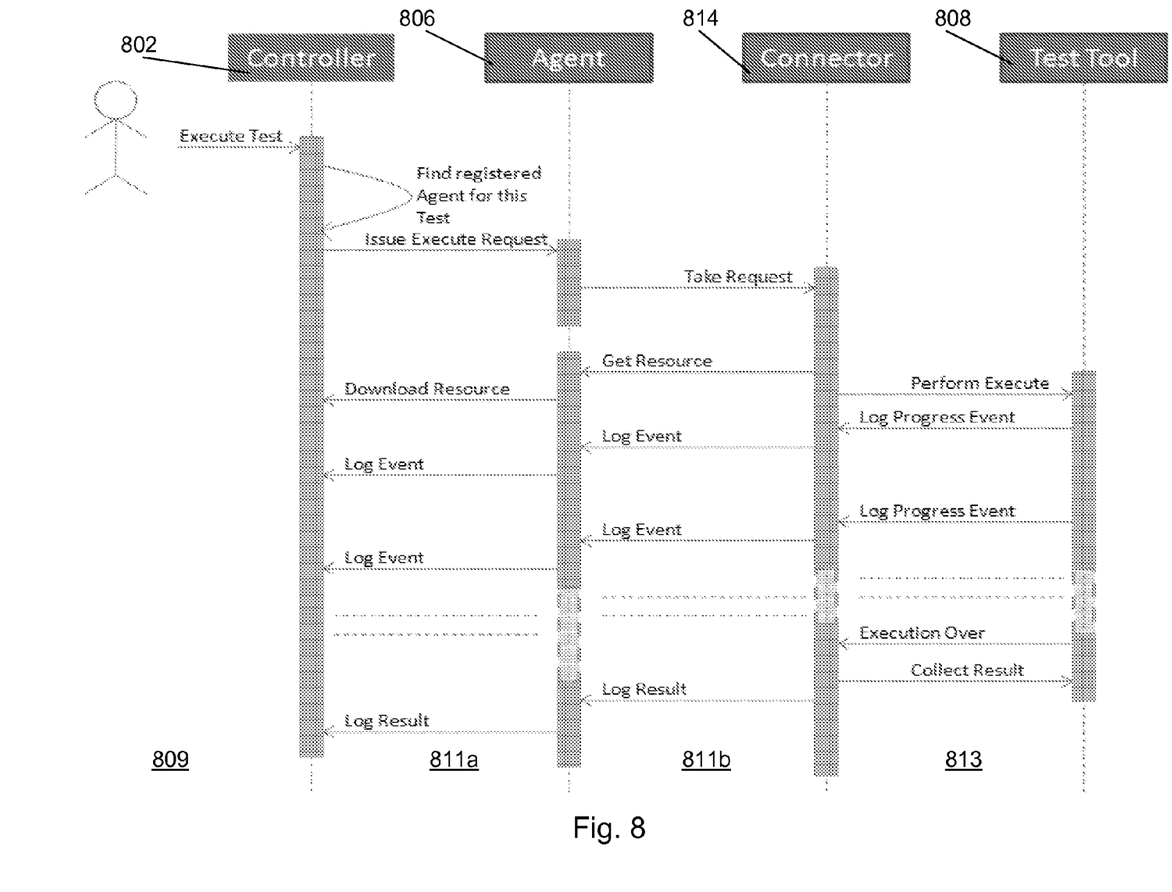
FIG. 8 schematically illustrates a process flow for test tool and agent registration, relative to the examples of FIGS. 6 and 7.

FIG. 8 schematically illustrates a process flow for remote test execution, relative to the example of FIG. 6. Essentially, the process of FIG. 8 is similar and analogous to that of FIG. 4, with the main difference being the interposition of connector 814 between agent 806 and test tool 808. Process actions relating solely to the controller 802 are shown in (drawing) field 809, while those between controller 802 and agent 806 are shown in field 811 a. For their part, process interactions between agent 806 and connector 814 are shown in field 811b, while those between connector 814 and test tool 808 are shown in field 813.

With an order to execute a test (809), controller 802 will then preferably aim to find a registered agent 806 for the test and request a test for same (811a). The agent 406 then preferably transfers the request "take request" to connector 814 (811b). Agent 806 then preferably (811a) downloads the work details and any resources (e.g., a test and its associated data) to controller 802, after first getting resources from connector 814 (at 811b). Then, execution preferably initiates (is performed) (813) at test tool 808. Test tool 808 can intermittently generate some events during execution, which are uploaded to the controller 802 via the connector 814 and agent 806 (see "log progress event" at 813 and "log event" at 811b and 811a). At the end of execution, the agent 806, in concert with connector 814, preferably collects all the logs from test tool 808 ("collect result" at 813) and uploads them to the controller 802 ("log result" at 811b and 811a).

Figure 9:
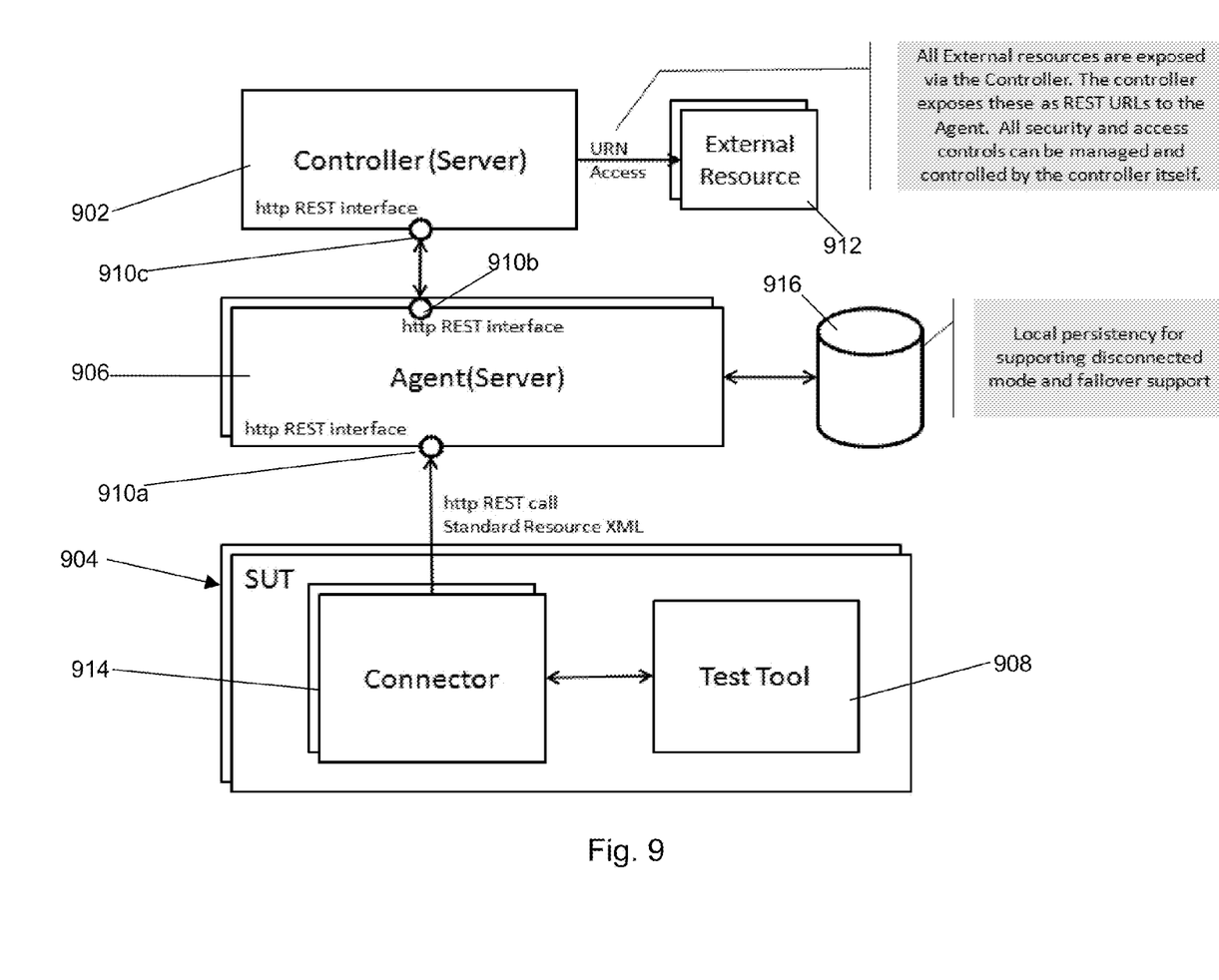
FIG. 9 schematically illustrates a process flow for remote test execution, relative to the examples of FIGS. 2 and 3.
Figure 10:
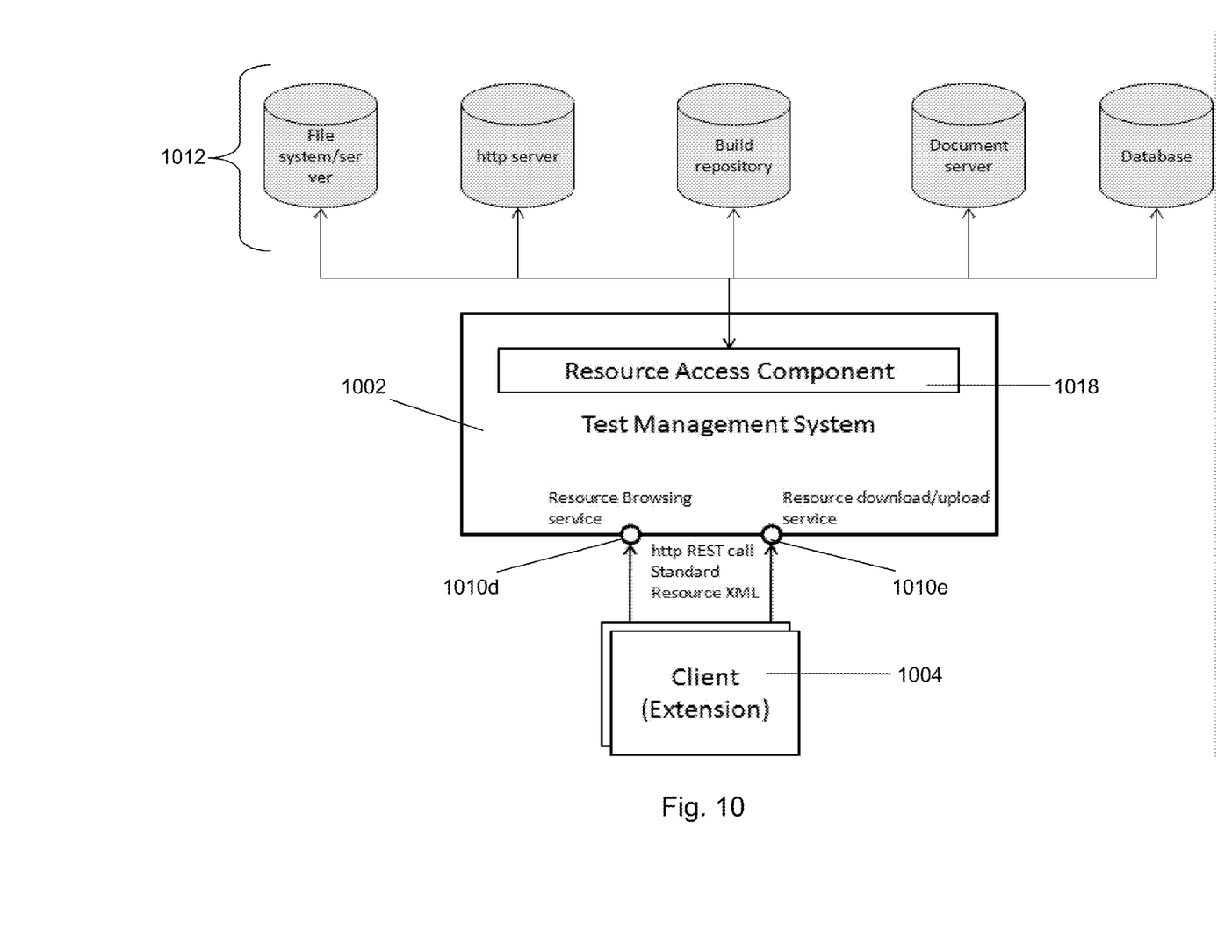
FIG. 10 schematically illustrates a test management system which permits resource sharing.

FIG. 9 is essentially the same view as FIG. 6, but additionally depicting external resource access. Essentially, the arrangement of FIG. 9 is similar and analogous to that of FIG. 5, with the main difference being the addition of database 916 (analogous in function to that indicated at 616 in FIG. 6), as well as the interposition of connector 914 between agent 906 and test tool 908. The description of FIG. 6 is equally relevant here in understanding the relationship between test tool 908, connector 914 and agent 906, in accordance with at least one embodiment of the present invention. Preferably, any and all external resources 912 will be exposed via the controller 902. Preferably, the controller 902 exposes one or more external resources 912 as REST URL's to agent 906. All security and access controls can be managed and controlled by the controller itself The disclosure now turns to another variant in accordance with at least one embodiment of the present invention, as illustrated in FIG. 10. As shown in FIG. 10 and described herebelow, a centralized Test Management System (TMS) can preferably permit collaboration, such as the sharing of resources. Such resources could include those that belong to practitioner tools that integrate with the TMS. Components in FIG. 10 that are analogous to A typical conventional solution in this vein is to the require the practitioner test tools to upload the tool specific resources into the Test Management Repository (TMR) so that such resources may be made available to the integrating test tools upon demand. This typically leads to many practical problems.

For one thing, the above conventional solution can be time consuming in that the resources may be used only after they are uploaded into the TM system. Redundancy is also an issue since typically the resources need to be managed in multiple locations and in concert with one another. Further, the TMS often cannot do much with the resources as typically the TMS will not understand the contents and maybe is thus only used as an "intermediary" or "way station" to pass such contents onto a client that actually can handle them. Also, the resource data format may well be closed and proprietary with respect to the TMS, making it difficult to write other clients to that data.

Another conventional solution involves simply maintaining the resource location in the TMS as a shared path that the test tool can access. This will have its own drawbacks. For instance, in a typical TMS lab, there may exist several test machines that need not necessarily be configured to be able to access the shared path. In such a setting, if the shared path location needs to be changed then that might require updating all of the TM"s that host test tools.

Network glitches and changes can also typically hamper the smooth working of the solution just noted. Also, each Test Execution Machine (TEM) might host multiple test tools, wherein each test tool would need to manage its own access to the shared location. There is also a possibility of sharing the resources from a given location across multiple tools, meaning that any change in the access mechanism or resource details would cumbersomely require an update in every single test tool.

Broadly contemplated herein, in accordance with at least one variant embodiment of the present invention, is an arrangement for managing resources at different types of resource storage arrangements and, at the same time, exposing the resources via a uniform HTTP REST interface so that they can be consumed or utilized by essentially any extension.

Particularly contemplated, in accordance with at least one embodiment of the present invention, is a provision for uniform access, to required resources, to consumers of a TMS 1002. Preferably, the TMS 1002 is configured with access to various types of repositories 1012 through an extension mechanism 1020, which is exposed via a resource access component 1018. (as such, resource access component 1018 preferably provides or affords an extension mechanism infrastructure which enables an extension mechanism 1020 to provide access to further repositories, such as those indicated at 1012.) As such, this arrangement need not be repeated for all TEM's (or clients) 1004 individually. Rather, the TMS 1002 can preferably provide access to standard resource repository types (e.g., a file system, source control system, document servers, build repository, web server, file server, etc.) while others maybe added through the extension mechanism (resource access mechanism) 1018. Preferably, the attendant specification will include protocol, URL, port and authentication details. In accordance with such an arrangement, the only needed administration would be to ensure that the TMS 1002 has access to the repositories 1012 instead of the individual TEM's or clients 1004. The system then exposes two sets of service, one for resource location browsing and the other for resource download and upload via HTTP REST interfaces 1010d and 1010e, respectively, as shown.

It should be understood and appreciated that, in accordance with features broadly contemplated herein in accordance with at least one embodiment of the present invention, a TMS 1002 as described and illustrated herein with respect to FIG. 10 may be considered to be analogous to a "controller" (e.g., 202, 602) as described and illustrated herein with respect to FIGS. 2-9. Further, a TEM or client 1004 as described and illustrated herein with respect to FIG. 10 may be considered to be analogous to a "SUT" (e.g., 204, 604) as described and illustrated herein with respect to FIGS. 2-9.

Accordingly, a TMS 1002 which has the capability to access resource storages 1012 via an original specification can now act as an "agent" for its clients and extensions, which all will now have the trust of this "agent". In this manner, resources can freely transfer from the original source to the final destination in the client and other extensions (1004) via the server through a single standard consumable HTTP REST interface.

Preferably, the resource access component 1018 hosted at TMS 1002 can include a registry which registers and stores various storage access specifications. In addition, the component may host a REST service or can utilize the HTTP server of the TMS 1002 if it has one. Since the resource access component 1018 is a fairly independent service, it need not necessarily be hosted on the TMS 1002 but alternatively could be hosted independently of the TMS 1002. Of course, the services 1012 could be exposed in any of the mechanisms native to the TMS 1012, but having a REST interface does enable a transparent, web-like accessibility to the resource storage.

Preferably, a resource browsing service will expose a set of methods for browsing through the resource store, irrespective of the type of resource store at hand. Preferably, a call to listResources( ) will return a list of proxy resources with some of their meta-information. A proxy resource, in turn, may then expose methods such as:

isAccessible( )—if this resource is accessible; and
listResources(Root)—list all the child resources.

Preferably, a resource download/upload service may expose a mechanism to download and upload resources to and from the TMS and eventually to the appropriate resource repository. Associated methods may be:

downloadResource(notModifiedSince)—download a resource. (preferably, further optimized to only download if it's been modified since the last time it was downloaded).
uploadResource(notModifiedSince, shallOverWriteNewer)—upload a resource such as results etc.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A system comprising:
    one or more processors and one or more modules executable by the one or more processors, the one or more modules comprising:
        computer program code configured to register an agent with a server mechanism;
        computer program code configured to poll a server mechanism regarding a work request;
        computer program code configured to maintain communication between an agent and a test tool and prompt test execution via the test tool, wherein a port is not exposed during the maintained communication; and
        computer program code configured to maintain communication between an agent and a server mechanism via a directed connection, wherein a port is not exposed during the maintained communication.

2. The system according to claim 1, wherein the one or more modules further comprise computer program code configured to periodically poll the server mechanism with work requests at predetermined intervals.

3. The system according to claim 1, wherein the one or more modules further comprise computer program code configured to maintain communication between an agent and a server mechanism via an HTTP connection with REST-ful services.

4. The system according to claim 1, wherein an agent is hosted with a test tool on a system under test.

5. The system according to claim 1, wherein the one or more modules comprise computer program code configured to maintain communication between an agent and a test tool via an interposing connector module.

6. The system according to claim 5, wherein the agent is disposed separately from a system under test.

7. The system according to claim 5, wherein the one or more modules further comprise computer program code configured to maintain communication between an agent and a server mechanism via an HTTP connection with REST-ful services.

8. The system according to claim 5, wherein the one or more modules further comprise computer program code configured to maintain communication between an agent and a connector module via an HTTP connection with REST-ful services.

9. The system according to claim 1, wherein the one or more modules further comprise computer program code configured to accord access of an agent to external resources through a server mechanism.

10. The system according to claim 9, wherein the one or more modules further comprise computer program code configured to accord URN access of an agent to external resources through a server mechanism.

11. The system according to claim 1, wherein the one or more modules further comprise computer program code configured to accord access of an agent to resource repositories through a test management system.

12. The system according to claim 11, wherein the one or more modules further comprise computer program code configured to maintain communication between an agent and a test management system via an HTTP connection with a REST-ful resource browsing service.

13. The system according to claim 11, wherein the one or more modules further comprise computer program code configured to maintain communication between an agent and a test management system via an HTTP connection with a REST-ful resource download/upload service.

14. A method comprising:
    registering an agent with a server mechanism;
    polling a server mechanism regarding a work request;
    maintaining communication between an agent and a test tool and prompting test execution via the test tool, wherein a port is not exposed during the maintained communication; and
    maintaining communication between an agent and a server mechanism via a directed connection, wherein a port is not exposed during the maintained communication.

15. The method according to claim 14, wherein said polling comprises periodically polling the server mechanism with work requests at predetermined intervals.

16. The method according to claim 14, wherein said maintaining communication between an agent and a server mechanism comprises maintaining communication via an HTTP connection with REST-ful services.

17. The method according to claim 14, wherein said maintaining communication between an agent and a test tool comprises maintaining communication via an interposing connector module.

18. The method according to claim 17, wherein an agent is disposed separately from a system under test.

19. The method according to claim 17, wherein said maintaining communication between an agent and a server mechanism comprises maintaining communication via an HTTP connection with REST-ful services.

20. The method according to claim 17, wherein said maintaining communication via a connector module comprises maintaining communication between an agent and a connector module via an HTTP connection with REST-ful services.

21. The method according to claim 14, further comprising according access of an agent to external resources through a server mechanism.

22. The method according to claim 21, wherein said according access comprises according URN access of an agent to external resources through a server mechanism.

23. The method according to claim 14, further comprising according access of an agent to resource repositories through a test management system.

24. The method according to claim 23, further comprising maintaining communication between an agent and a test management system via an HTTP connection with REST-ful services.

25. A computer program product comprising:
a non-transitory computer readable medium containing computer readable program code stored therein for causing a computer processor to perform the following steps, the computer readable program code comprising:
computer program code configured to register an agent with a server mechanism;
computer program code configured to poll a server mechanism regarding a work request;
computer program code configured to maintain communication between an agent and a test tool and prompt test execution via the test tool, wherein a port is not exposed during the maintained communication; and
computer program code configured to maintain communication between an agent and a server mechanism via a directed connection, wherein a port is not exposed during the maintained communication.

* * * * *